United States Patent [19]

Vlasbloem

[11] Patent Number: 4,859,855

[45] Date of Patent: Aug. 22, 1989

[54] DOSIMETER FOR IONIZING RADIATION

[75] Inventor: Hugo Vlasbloem, Maasland, Netherlands

[73] Assignee: B.V. Optisch Industrie 'De Oude Delft' , Delft, Netherlands

[21] Appl. No.: 931,539

[22] Filed: Nov. 14, 1986

[30] Foreign Application Priority Data

Nov. 15, 1985 [NL] Netherlands ........................ 8503153

[51] Int. Cl.[4] ........................ G21K 1/04; G01T 1/185

[52] U.S. Cl. .............................. 250/385.1; 250/354.1; 378/145

[58] Field of Search .................. 250/385.1, 354.1, 374; 378/108, 160, 145

[56] References Cited

U.S. PATENT DOCUMENTS

| | | | |
|---|---|---|---|
| 3,984,691 | 10/1976 | Allemand et al. | 250/385 |
| 4,031,396 | 6/1977 | Whetten et al. | 250/385 |
| 4,032,784 | 6/1977 | Rich | 378/108 |
| 4,119,853 | 10/1978 | Shelley et al. | 250/385 |
| 4,211,926 | 7/1980 | Nakaya et al. | 250/385 |
| 4,230,944 | 10/1980 | Wiegman et al. | 250/385 |
| 4,675,893 | 6/1987 | Duinker et al. | 378/145 |
| 4,715,056 | 12/1987 | Vlasbloem et al. | 378/147 |

OTHER PUBLICATIONS

*Handbook on Synchrotron Radiation,* E. Koch, Editor, vol. 1A, North Holland Publishing Co., New York (1983), pp. 323–328.

Dhawan et al., "A Multiwire Proportional Counter with 5 Wires per Millimeter," 1973 Int'l Conference on Instumentation for High Energy Physics (May 1973), pp. 313–315.

*Primary Examiner*—Janice A. Howell
*Assistant Examiner*—William F. Rauchholz
*Attorney, Agent, or Firm*—Louis E. Marn

[57] ABSTRACT

A dosimeter for ionizing radiation is of oblong shape. It comprises a gas-filled measuring chamber surrounded by a casing. Two opposite side walls are manufactured of material transparent to the ionizing radiation. One of the transparent side walls is provided with a transparent plate-like electrode. The other transparent side wall is provided with a number of strip-like electrodes extending transversely to the longitudinal direction of the measuring chamber. A guard electrode surrounds the plate-like electrode. The dosimeter being transparent to X-rays can be used particularly in slit radiography equipment in which the slitwidth can be controlled locally and independently along the length of the slit.

32 Claims, 2 Drawing Sheets

FIG.6
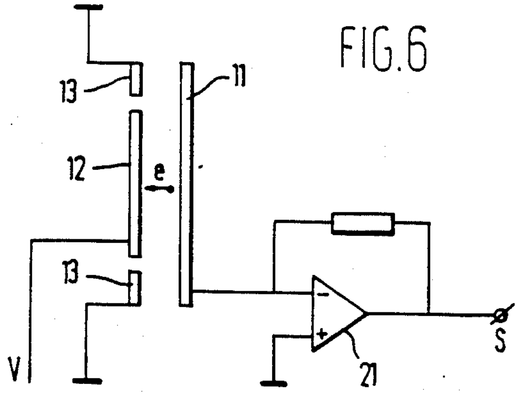
FIG.7
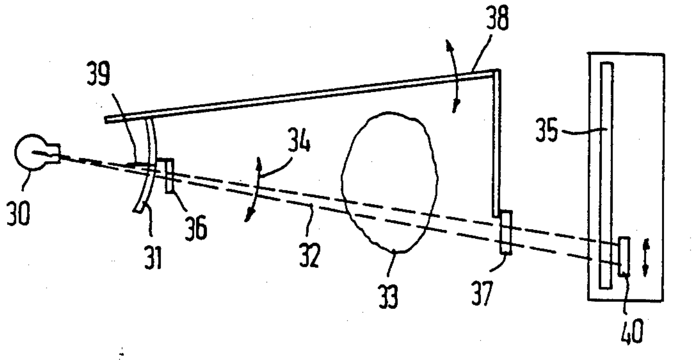
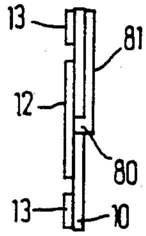
FIG.8
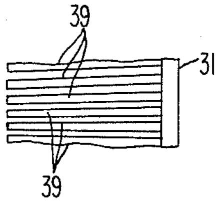
FIG.7a

DOSIMETER FOR IONIZING RADIATION

BACKGROUND OF THE INVENTION

The invention relates to a dosimeter for ionizing radiation comprising a gas-filled measuring chamber surrounded by a casing in which there extends a number of electrode elements between which an electrical voltage exists during operation, the casing being provided with at least one entry window for the ionizing radiation.

Such dosimeters are already known from the Handbook on Synchrotron Radiation, Volume 1A, pages 323–328 by Ernst Eckhard Koch, published by North Holland Publishing Company, Amsterdam, New York, Oxford, 1983. A drawback of said known dosimeters is that application thereof is not readily possible in slit radiography equipment, where it has to be possible to measure and regulate the quantity of radiation per diaphragm section transmitted through a diaphragm slit at any instance during the production of a radiograph. An example of such slit radiography equipment, which does not, however, employ a dosimeter of the type described above, is described in the Dutch Patent Application 8,400,845. The known dosimeters are not designed to attenuate the radiation, the strength of which has to be measured, as little as possible and to prevent the formation of a visible X-ray shadow image of the dosimeter itself as far as possible. This latter is, however, of great importance in slit radiography equipment because the radiation transmitted through the dosimeter serves to produce the required radiograph. The shape and dimensions of the known dosimeters also make them unsuitable for application in slit radiography equipment.

SUMMARY OF THE INVENTION

The object of the invention is to meet this need. For this purpose, a dosimeter of the type described is characterized according to the invention in that the casing has an oblong shape and in that the measuring chamber is an oblong cavity recessed in the casing, at least two side walls of the casing, which are situated opposite each other, being manufactured from material transparent to ionizing radiation and there being disposed on the inner surface of the one side wall transparent to ionizing radiation a plate-like first electrode which largely covers said inner surface, while there is disposed on the inner surface of the second side wall a large number of strip-like second electrodes extending essentially transversely to the longitudinal direction of the measuring chamber.

BRIEF DESCRIPTION OF THE DRAWINGS

The invention will be described below in more detail with reference to the accompanying drawing of an exemplary embodiment.

FIG. 6 shows the electrical circuit of a dosimeter according to the invention;

FIG. 7 shows how a dosimeter according to the invention can be applied in slit radiography equipment;

FIG. 7*a* is an enlarged partial top elevational view of a plurality of attenuating elements for the slit diaphragm; and;

FIG. 8 shows a variation of FIG. 5 diagrammatically.

DETAILED DESCRIPTION OF THE DRAWINGS

Figure 1:
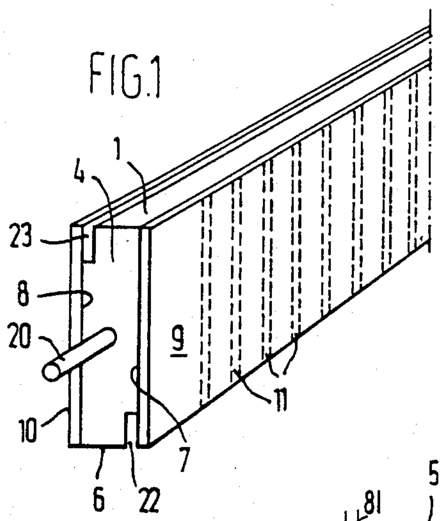
FIG. 1 shows in perspective a part of an embodiment of a dosimeter according to the invention.
Figure 2:
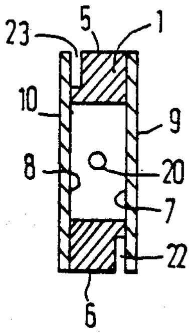
FIG. 2 shows a cross-section of the dosimeter of FIG. 1.
Figure 3:
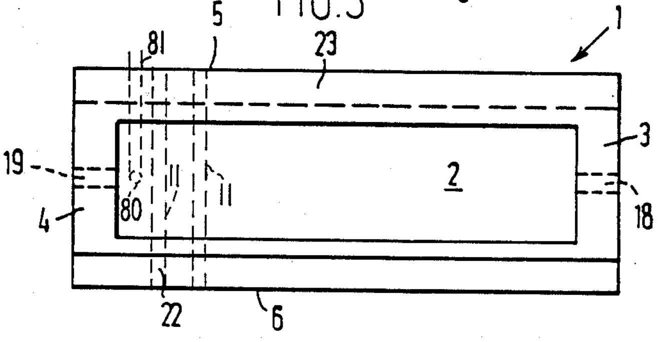
FIG. 3 shows a frame for a dosimeter according to the invention.

FIG. 1 shows in perspective an exemplary embodiment of a dosimeter according to the invention. The dosimeter comprises an oblong, in this example substantially a rectangular, frame 1 which surrounds an oblong, in this example substantially rectangular, cavity 2 (FIG. 3). The frame has two short limbs 3, 4 and two long limbs 5, 6 and may be manufactured, for example from a flat plate of a suitable insulating material such as glass or acrylic so that the side surfaces of the limbs jointly define two parallel side faces 7, 8.

Cover plates 9, 10 made of a suitable insulating material such as glass or acrylic are mounted in a vacuum-tight manner, for example by gluing, against the side faces 7, 8. With the cover plates the frame therefore forms a sealed casing which contains an oblong measuring chamber 2.

Figure 4:
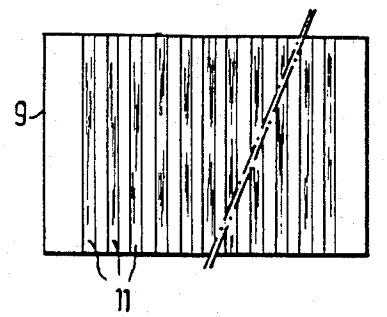
FIG. 4 shows a first cover plate for the frame of a dosimeter according to the invention.

On the surfaces of the cover plates which face each other there are disposed electrodes between which an electrical field exists during operation. On the inner surface of the one plate 9 there is disposed, uniformly distributed over the length of the measuring chamber 2, a number of strip-like electrodes 11 of a conducting material which extend substantially transversely to the longitudinal direction of the measuring chamber. This is again shown in FIG. 4, which figure shows the inner surface of the plate 9.

On the inner surface of the plate 10 there is disposed a flat electrode 12 which essentially occupies the whole of the inner surface of the plate 10 not occupied by the frame.

Figure 4A:
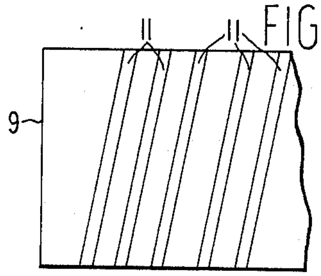
FIG. 4*a* shows a first cover plate with obliquely disposed strip-like electrodes.

FIG. 4*a* illustrates strip-like electrodes 11 extending obliquely to a transverse axes of, the measuring chamber.

Figure 5:
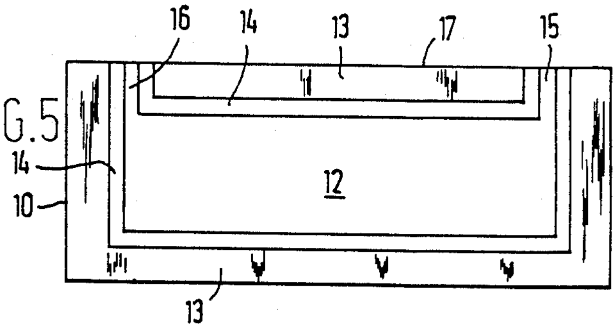
FIG. 5 shows a second cover plate for the frame of a dosimeter according to the invention.

In the preferred embodiment shown in FIG. 5 the flat electrode is surrounded all round by a guard electrode 13 which extends along the edges of the plate 10, which guard electrode is also disposed on the surface of the plate 10. The flat electrode and the guard electrode are separated from each other by a small gap 14. In the example shown the guard electrode is interrupted at least one position to allow a connecting section for the flat electrode through which extends to the edge of the plate 10. In the example shown two of said connecting sections 15, 16 are provided and the two connecting sections are situated on the same edge 17 of the plate 10.

It is pointed out that the operation of the guard electrode may be further optimized, if desired, by omitting the gap(s). The flat electrode may then be provided with an electrical connection via a vacuum-tight lead through the plate 10 as shown diagrammatically in FIG. 8. The lead through 80 is preferably situated outside the region situated opposite the electrodes 11 and may be connected with a wire or, as shown, via a conducting strip 81 (See FIG. 8) disposed on the outside of the plate 10.

The measuring chamber is filled with a suitable gas which can be ionized by the radiation to be measured. Such a suitable gas is, for example, xenon.

In order to be able to fill the measuring chamber with the gas and to be able to evacuate it beforehand, there are disposed, at two positions in the example shown, holes 18, 19 in the short limbs of the frame, in which holes 18, 19 small tubes of, for example, copper are placed. Such a small tube is indicated in FIG. 1 by 20. After the measuring chamber has been evacuated via the small tubes and then filled with the gas, the small tubes are sealed in a vacuum-tight manner, for example by pinch sealing and soldering.

The electrodes may be formed, for example, by deposition of a suitable conducting material by evaporation, the areas which are not to be covered with electrode material being temporarily masked. In a practical embodiment, with a casing manufactured from acrylic, the electrodes are formed by depositing a thin layer of nickel having a thickness of approximately 1 $\mu$m at the required positions by means of a sputtering technique. Such electrodes do not attenuate, or virtually do not attenuate, X-ray radiation. In said practical embodiment the measuring chamber had a length of approximately 42 cm and a height of approximately 3.5 cm, and 160 strip-like electrodes were used having a pitch of approximately 2.54 mm and a gap between them of approximately 1 mm. The total thickness of the dosimeter was approximately 10 mm.

The strip-like electrodes 11 may serve as anode strips, in which case the flat electrode 12 is connected as a cathode. However, it is also possible to connect the strip-like electrodes 11 as cathode strips, while the flat electrode 12 is then connected as an anode. Such a circuit is shown diagrammatically in FIG. 6.

In the example shown in FIG. 6 a positive voltage V is applied to the flat electrode, which is in this case the anode. The guard electrode 13 is grounded and serves to discharge any leakage currents. Depending on the specific application of the dosimeter, the cathode strips 11 are connected jointly or per group or separately to an associated amplifier 21 which provides, at an output terminal S, the amplified measurement signal which is produced by ionization of the gas in the measuring chamber under the influence of, for example, X-ray radiation.

If xenon is used as the gas filling of the measuring chamber, the anode-cathode voltage may be chosen in the flat region of the current-voltage characteristic which is valid for gases. Such a characteristic gives the relationship between the anode-cathode voltage for a certain constant dose of radiation and the signal current which appears as a result of the ionizing radiation. In said flat region the signal current is virtually independent of the anode-cathode voltage so that the signal current depends exclusively on the number of quanta of ionizing radiation received. If xenon is used, it is possible to work in this region because xenon has a relatively high absorption factor (large photon cross-section) for ionizing radiation and provides an adequately high signal current even in said flat region of the characteristic. It is therefore not necessary to employ a higher anode-cathode voltage in the so-called gas multiplication region. An advantage of this is that the setting of the anode-cathode voltage is not very critical. The anode-cathode voltage V may be, for example, 600 V.

Another advantage of the dosimeter described is that, as a result of the chosen configuration, the field lines of the electrical field between the anode and cathode electrode(s) extend essentially perpendicularly between the plates 9 and 10. As a result of this the output signals of the dosimeter are virtually independent of the distance between the two plates. As a result of this the dosimeter described is insensitive to variations in the atmospheric pressure.

The electrodes may be connected electrically in a simple manner by making the plates 9 and 10 somewhat larger than the frame so that one of the long edges, over which the electrodes then have to continue, of the plates 9 and 10 extend outside the frame. The electrical connections may then be produced, for example, by means of a suitable connector which can be pushed over the projecting edge of a plate.

Although the plates 9 and 10 in the exemplary embodiment shown are equally as large as the frame, two recesses 22 and 23 respectively are formed along two outermost longitudinal edges of the frame which are situated diagonally opposite each other, which recesses extend over the whole length of the frame, so that the same effect is achieved.

FIG. 7 shows some possibilities of application of a dosimeter according to the invention in slit radiography equipment.

It is pointed out that the dosimeter may also be applied in other situations and is in particular suitable, in general, for detecting the distribution and variation of the intensity of ionizing radiation over an extensive region and is in particular suitable for performing said detection without substantially affecting the radiation to be detected.

If only the total dose of ionizing radiation is of interest in the measurement region, the signals from the strip-like electrodes can be added together or the strip-like electrodes can be connected together.

FIG. 7 shows diagrammatically slit radiography equipment having X-ray source 30 which can irradiate a body 33 to be investigated with a flat X-ray beam 32 having a scanning movement indicated by an arrow 34 via a slit diaphragm 31 in order to form an X-ray image by means of an X-ray detector 35 placed behind the body.

If it is only desired to determine the total X-ray dose to which the body 33 is exposed during one or more scanning movements, the dosimeter may be disposed in the vicinity of the slit diaphragm or even against the slit diaphragm as shown diagrammatically at 36.

The output signals from the dosimeter cannot then be used, however, to control the quantity of radiation transmitted locally through the slit diaphragm in order to obtain an equalized radiograph as described in Dutch Patent Application 8,400,845. For this purpose, the dosimeter has to be situated, as indicated at 37, between the body 33 and the X-ray detector 35 and obviously has to track the scanning movement of the X-ray beam 32. The dosimeter may be mounted, for example, on an arm 38 which moves synchronously with the slit diaphragm. The output signals from one strip-like electrode at a time or from a number of strip-like electrodes situated next to each other provide a measure of the radiation intensity prevailing instantaneously in the associated sector of the X-ray beam and, therefore, also of the brightness of the part of the radiograph to be produced corresponding to said sector. Said output signals can therefore be used to control attenuating elements 39 referring to FIG. 7_a_ which interact with the corresponding section of the slit diaphragm in order to achieve image equalization.

In order to prevent large differences between the output signals of (sets of) strip-like electrodes of the dosimeter which interact with adjacent sections of the slit diaphragm, the output signal from each set of strip-like electrodes belonging to a certain diaphragm section or, if one strip-like electrode is present for each diaphragm section, from each strip-like electrode may be combined, if desired, with the output signal from one or more strip-like electrodes belonging to adjacent sections of the slit diaphragm, in order to obtain the control signal for the section concerned.

In a practical embodiment a dosimeter according to the invention may contain for example 160 wires. If the slit diaphragm has, for example, twenty controllable sections, eight strip-like electrodes are available per section. The signals from said eight electrodes are then combined into a control signal for the associated diaphragm section. However, as described above, the output signals of one or more adjacent electrodes belonging to adjacent sections might also be additionally involved in the formation of the control signal.

Depending on the type of X-ray detector used, it is possible, as an alternative, to control the attenuation elements on the basis of the radiation transmitted by the X-ray detector 35. The dosimeter may then be sited behind the X-ray detector, as indicated at 40, and must therefore again move synchronously along with the scanning movement of the X-ray beam 32.

In any case it is an advantage that a dosimeter according to the invention can be constructed with a very small thickness, in the order of 10 mm or less.

Despite the fact that very thin strip-like electrodes may be used, there is the risk that said electrodes may give rise to spurious signals in the form of thin strips in the radiograph to be produced depending on the electrode material used. If desired, this can be prevented by ensuring that the strip-like electrodes extend somewhat obliquely with respect to the scanning direction. This can be achieved in a simple manner by mounting the dosimeter itself somewhat obliquely with respect to the scanning direction or by mounting the strip-like electrodes at a small angle with respect to the centre line of the dosimeter.

It is pointed out that if nickel electrodes as described above are used, no troublesome spurious signals occur.

It is pointed out that, in addition to the above, various modifications are obvious to those skilled in the art. Such modifications are considered to fall within the scope of the invention.

What is claimed is:

1. A dosimeter for ionizing radiation comprising a casing defining a gas-filled measuring chamber in which there is provided electrode elements and wherein said casing is provided with at least one entry window for the ionizing radiation, characterized in that said casing is of an oblong shape defining an oblong measuring chamber said casing including at least two opposed side walls manufactured of a material transparent to ionizing radiation, one side wall is provided with a plate-like electrode substantially covering said inner surface and a guard electrode surrounding said plate-like electrode, an inner surface of another side wall is provided with a plurality of strip-like electrode elements extending essentially transversely to said oblong measuring chamber.

2. The dosimeter according to claim 1 wherein said casing includes an oblong frame mounted in a gas-tight manner between said side walls.

3. The dosimeter according to claim 2 wherein said casing is manufactured from glass.

4. The dosimeter according to claim 2 wherein said casing is manufactured from acrylic.

5. The dosimeter according to claim 1 wherein said electrodes are formed by depositing a layer of conducting material in a required pattern by evaporation.

6. The dosimeter according to claim 1 wherein said electrodes are formed of nickel.

7. The dosimeter according to claim 1 wherein a strip of each side wall extends beyond said casing and said electrodes are provided with connecting sections.

8. The dosimeter according to claim 7 wherein each strip is constructed as a connecting connector.

9. The dosimeter according to claim 7 or 8 wherein a strip of each side wall defines a recess with said casing extending lengthwise along outermost edges of said frame diagonally opposite one another.

10. The dosimeter according to claim 1 wherein said casing includes a sidewall having a hole for inserting a tube for evacuating said oblong measuring chamber and wherein said tube is sealed after introduction of gas into said oblong measuring chamber.

11. The dosimeter according to claim 1 wherein said oblong measuring chamber is filled with xenon.

12. The dosimeter according to claim 11 wherein potential difference between said plate-like electrode and said strip-like electrode elements during operation prevents gas multiplication.

13. The dosimeter according to claim 1 wherein said strip-like electrode elements extend obliquely with respect to a transverse direction of said oblong measuring chamber.

14. The dosimeter according to claim 1 wherein said electrodes are formed by depositing a layer of metal in a desired pattern on the side wall by sputtering techniques.

15. The dosimeter according to claim 14 characterized in that said electrodes are formed of nickel.

16. An apparatus for slit radiography, which comprises:

an X-ray source;

an X-ray detector collecting radiation passing through a body to be radiographed;

a slit diaphragm positioned between said X-ray source and said body for forming a planar X-ray beam;

a plurality of attenuating elements positioned along said slit diaphragm forming a plurality of attenuating sections;

means for scanning said body with said planar X-ray beam;

a detection member disposed in a path of said planar X-ray beam to measure ionizing radiation comprised of an oblong-shaped casing defining a gas-filled chamber said casing having at least two side walls formed of a material transparent to ionizing radiation, one side walls having a plurality of strip-like electrodes extending transversely to a longitudinal direction of said oblong-shaped casing, another side wall having a plate-like electrode, said electrode capable of being connected to a source of electromotive force, each of said strip-like electrodes generating a signal representative of intensity of ionizing radiation, a group of said strip-like electrode corresponding to a respective attenuating element;

means for moving said detection member in synchronization with said means for scanning said body with said planar X-ray beam; and means for simultaneously controlling each of said attenuating elements during scanning of said body in response to electric signals produced at respective group of said strip-like electrode.

17. The apparatus for slit radiography as defined in claim 16 wherein said casing includes an oblong frame mounted in a gas-tight manner between said side walls.

18. The apparatus for slit radiography as defined in claim 17 wherein said casing is manufactured from glass.

19. The apparatus for slit radiography as defined in claim 17 wherein said casing is manufactured from acrylic.

20. The apparatus for slit radiography as defined in claim 16 wherein and further including a guard electrode surrounding said plate-like electrode on said side wall.

21. The apparatus for slit radiography as defined in claim 16 wherein said electrodes are formed by depositing a layer of conducting material in a required pattern by evaporation.

22. The apparatus for slit radiography as defined in claim 21 wherein said electrodes are formed of nickel.

23. The apparatus for slit radiography as defined in claim 16 wherein said electrodes are formed by depositing a layer of metal in a desired pattern by means of sputtering technique.

24. The apparatus for slit radiography as defined in claim 23 characterized in that said electrodes are formed of nickel.

25. The apparatus for slit radiography as defined in claim 16 wherein a strip of each side wall extends beyond said casing and said electrodes are provided with connecting sections.

26. The apparatus for slit radiography as defined in claim 25 wherein each strip is constructed as a connecting connector.

27. The apparatus for slit radiography as defined in claim 25 or 26 wherein a strip of each side wall defines a recess with said casing extending essentially lengthwise of said frame along outermost edges of said frame diagonally opposite one another.

28. The apparatus for slit radiography as defined in claim 16 wherein said casing includes a side-wall having a hole for inserting a tube for evacuating said measuring chamber and wherein said tube is sealed after introduction of gas into said measuring chamber.

29. The apparatus for slit radiography as defined in claim 16 wherein said measuring chamber is filled with xenon.

30. The apparatus for slit radiography as defined in claim 29 wherein said potential difference between said plate-like eledtrode and said strip-like electrodes during operation prevents gas multiplication.

31. The apparatus for slit radiography as defined in claim 16 wherein said strip-like electrodes extend obliquely with respect to said longitudinal direction of said measuring chamber.

32. The apparatus for slit radiography as defined in claim 16 wherein said detection member is mounted obliquely with respect to direction of scanning movement.

* * * * *